Sept. 12, 1961  V. P. MILLER  2,999,292
APPENDAGING MACHINES
Filed April 8, 1959  4 Sheets-Sheet 2

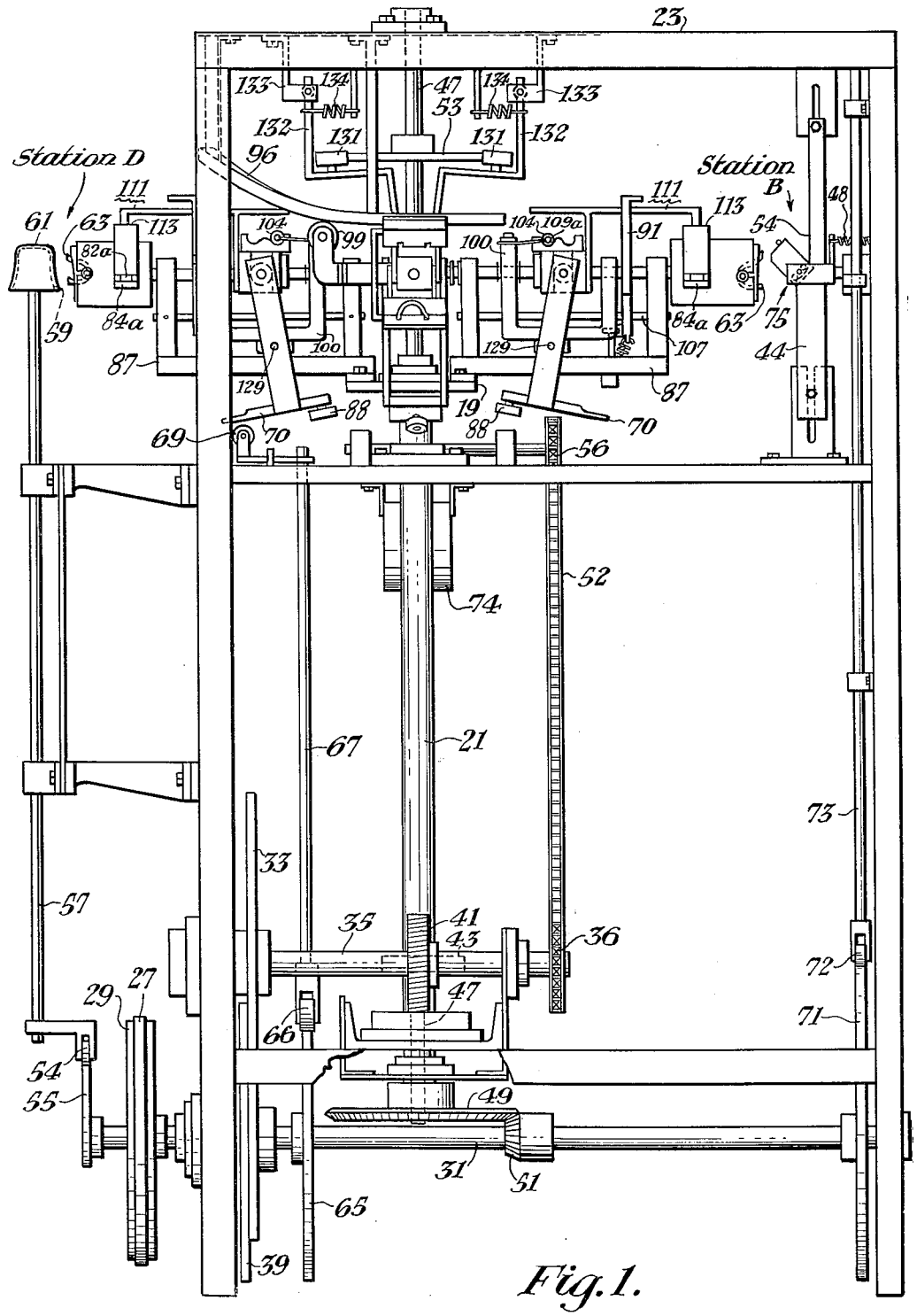

Sept. 12, 1961 V. P. MILLER 2,999,292
APPENDAGING MACHINES
Filed April 8, 1959 4 Sheets-Sheet 3

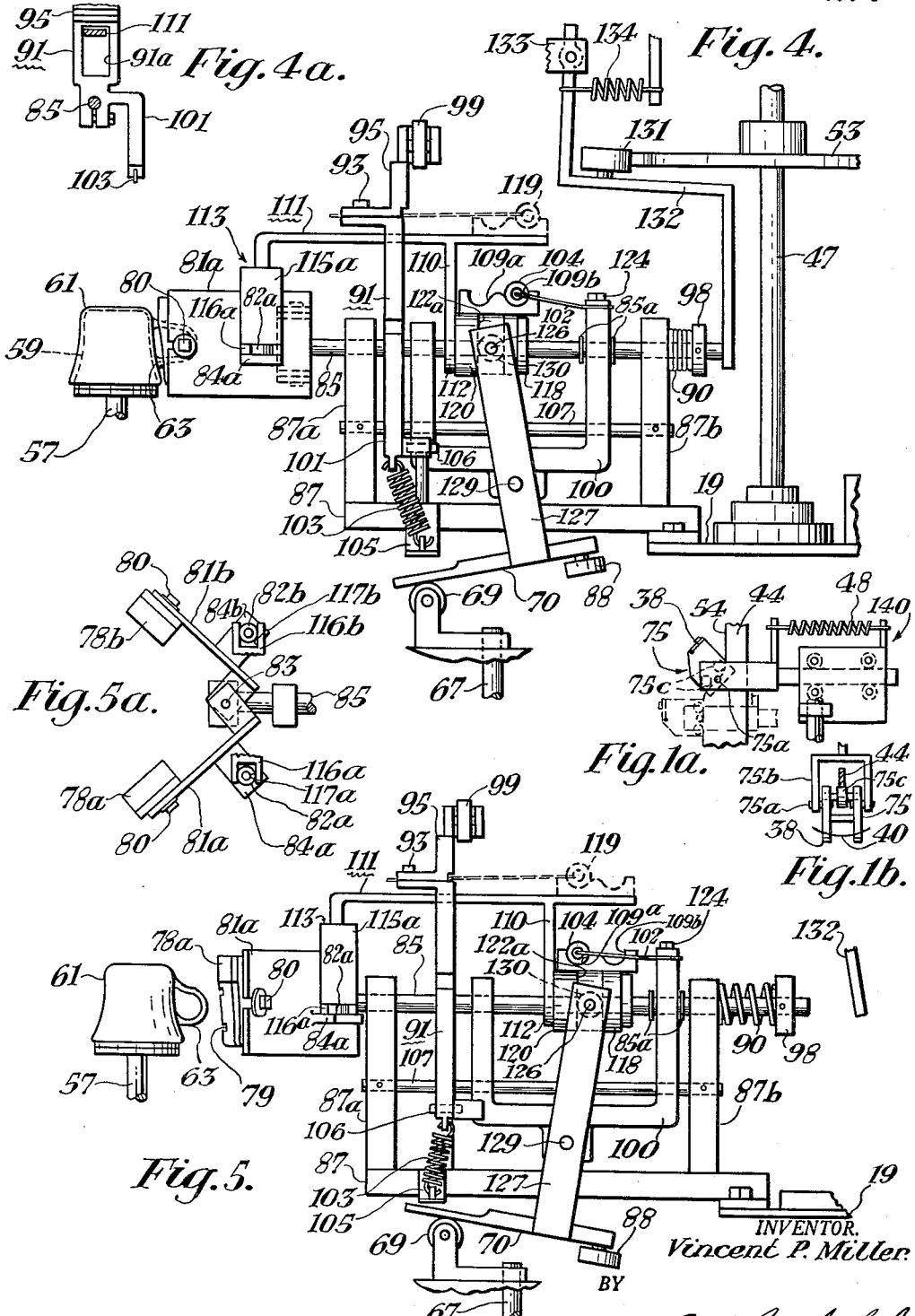

_United States Patent Office_

2,999,292
Patented Sept. 12, 1961

2,999,292
APPENDAGING MACHINE
Vincent P. Miller, Pittsburgh, Pa., assignor to Miller Pottery Engineering Company, Pittsburgh, Pa., a corporation of Pennsylvania
Filed Apr. 8, 1959, Ser. No. 804,902
9 Claims. (Cl. 25—22)

The present invention relates to an appendaging machine and more particularly to a new and improved machine for joining appendages such as handles to cups or the like.

In cups made from clay base material, the cup and the handle are usually made separately and then joined when the separate parts are partially dry. The cup handles are normally cast in plaster molds which results in the handles being formed with unfinished ends. The handle ends are next trimmed to correspond to the shape of the cup and the trimmed ends are then coated with a clay liquid used as a bonding agent and pressed against the cup. At the time of joining, both the cup and the handle may be in a somewhat flexible state and a comparatively high degree of skill is required to manually join the parts rapidly while maintaining an acceptable degree of quality.

As indicated above, the cups are normally removed from their molds and the handles attached thereto while the cups still contain a considerable moisture content. At this point the cups may not be completely shrunk to their final dry size and some variation in cup diameters may be expected because of differences in moisture content between cups. The chucks for supporting the cups must not fit the interior of the cups too tightly since the cups may be damaged by undue pressure during placement or removal from the chuck. Consequently, the chuck must be made to fit the smallest cup interior to be expected, and those cups having relatively larger interiors will fit rather loosely on the chuck. In the operation of my machine, I have therefore found it desirable to support the cups in an inverted position on the chucks, with the opening of the cup facing downward. This position insures that the cup is held securely on the chuck. Additionally, this inverted position of the cup is preferable if auxiliary automatic equipment is used to convey the cup to a handle joining position since the cup is most conveniently picked up and deposited when in this position.

I have also found it desirable to press the handle against the cup by a rectilinear motion of the handle assembly, i.e., in a straight line reciprocating motion. By so doing, any cup resting somewhat loosely on the chucks can be relocated by a balanced pressure of the handle ends without causing the cup to be raised or tilted as the handle is affixed thereto.

Accordingly, it is an object of my invention to provide a new and improved machine for joining handles to cups.

Another object of my invention is to provide a new and improved head assembly for transferring and positioning appendages or other articles.

Another object of my invention is to provide appendage-holding jaws which may be controllably advanced to a station at which an operation may be performed on the handle and whereupon the jaws may optionally be actuated or not actuated.

Another object of my invention is to provide jaws that may optionally be pivoted about the axis of a supporting shaft while in both open and closed positions and which jaws may optionally be actuated or not actuated while in any pivoted position.

Still another object of my invention is to provide a head assembly that may be controllably reciprocated, said head assembly having jaws which may optionally be actuated or not actuated while in any reciprocated position.

Further objects and advantages of my invention will become apparent from the following description and the accompanying drawings, and the features of novelty which characterize my invention wil be pointed out with particularity in the claims annexed to and forming part of this specification.

In the attainment of the foregoing objects I provide an appendaging machine including a head assembly having jaws for receiving a handle; and, said jaws being closable to hold said handle. Said head assembly being pivotable about a first axis and being rotatable about a second axis transverse to said first axis to convey said handle from loading stations to operating or processing stations. Said head assembly being extendable in a rectilinear direction to press said handle against the surface of an associated cup to join said handle thereto; and, said jaws being openable to release said handle.

For a detailed explanation of my invention, reference is made to the accompanying drawings, in which like designating characters refer to like elements throughout and in which:

FIG. 1 is a front elevation view of an embodiment of my invention;

FIG. 1a (on Sheet 4) is an enlarged side view of the trimmer unit of Station B shown in FIG. 1;

FIG. 1b (on Sheet 4) is an enlarged top view of the trimmer unit;

FIG. 4 is a side view of a head assembly in an extended position in its movement toward a cup;

FIG. 4a is a front view of the transverse member 91;

FIG. 5 is a side view of a head assembly in a retracted position with the jaws opened after the handle is affixed to the cup;

FIG. 5a is a fragmentary top view of the jaws in a position as shown in FIG. 5;

Figure 6:
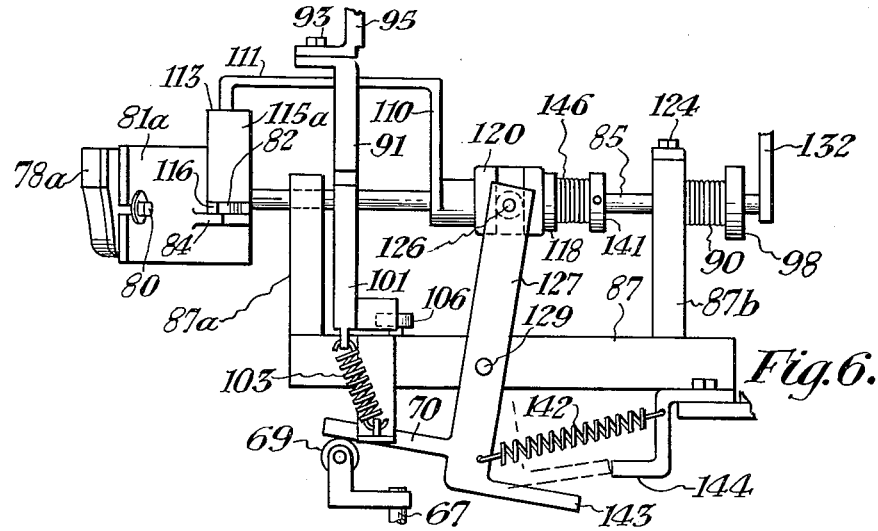
FIG. 6 is a side view of a second embodiment of a head assembly in accordance with my invention.

In describing my invention, reference will first be made to FIGS. 1, 2 and 3 which are the front, top and side view respectively of an embodiment of my appendaging machine.

Four head assemblies 11, 13, 15 and 17 are symmetrically mounted on a center plate 19 affixed to a vertical shaft 21 which shaft is journaled on a frame structure 23. The head assemblies extend radially from shaft 21 and lie in a horizontal planes. As will be described more fully hereinbelow, shaft 21 is intermittently rotated counterclockwise, as oriented in FIG. 2, in discrete or progressive steps by a Geneva gear to consecutively position each of the head assemblies 11, 13, 15 and 17 adjacent each of the operating stations A, B, C and D on frame 23 so that a distinct operation may be performed on a cup handle at each station. The head assemblies remain at each station for a predetermined time to permit each operation to be completed. More specifically, at station A a cup handle is loaded onto the jaws of a head assembly, at station B the cup handle is trimmed to fit the contour of the cup on to which the handle is to be joined, at station C an adhesive material is applied to the ends of the handle, and at station D the handle is pressed and joined or affixed onto the side of a cup mounted in an inverted position on a chuck.

Each of the various operation are being performed, on different handles, by different head assemblies concurrently.

The prime mover for the system consists of a electric motor 25 which is connected by a belt 27 to a drive wheel 29 mounted on a main drive shaft 31, which shaft is in turn journaled on frame 23. A five star Geneva gear 33, of a type well known in the art, is mounted on a shaft 35. Geneva gear 33 is driven by a single roller tooth 37 of a Geneva driver 39 which driver is mounted on the continually rotating main drive shaft 31. Shaft 35 is intermittently indexed through 72° by gear 33.

Spiral gear 41 on shaft 35 engages spiral gear 43 on vertical shaft 21. Due to a 4:5 ratio between spiral gears 41 and 43, indexing of shaft 35 through 72° causes vertical shaft 21 to index 90° in a counterclockwise direction, as oriented in FIG. 2.

Vertical shaft 21 is hollow for receiving a driving rod 47. Bevel gear 49 on the lower end of rod 47 engages bevel gear 51 on the main drive shaft 31, and continually rotates rod 47 in a direction opposite to the rotation of shaft 21. Shaft 21 and rod 47 require the same period of time to rotate 360°. A radial cam 53 having four symmetrically arranged raised and dwell portions, is mounted on the upper end of rod 47 for purposes hereinafter described.

A radial cam 55 is affixed to the left hand end, as oriented in FIG. 1, of main drive shaft 31. A rod 57 having a roller follower 54 on its lower end, is gravity biased to ride on the periphery of cam 55 and is reciprocated vertically thereby. A chuck 59 on the upper end of rod 57 receives a cup 61 in an inverted position. The periphery of cam 55 is shaped so that during each time period a head assembly is at station D, a cup 61 on chuck 59 is raised to a position at which a cup handle 63 may be pressed against the side of the cup.

A second radial cam 65 is affixed intermediate the ends of main drive shaft 31. A pusher rod 67, having a roller follower 66 on its lower end, is gravity biased to ride on the periphery of cam 65 and is reciprocated vertically thereby. A roller 69 on the top of rod 67 is positioned to engage a treadle 70, as rod 67 moves upward, to cause the jaws 81 of the head assemblies to open as will hereinafter be further described.

A third radial cam 71 is affixed on the right end of main drive shaft 31. A rod 73, having a roller follower 72 on its lower end, is gravity biased to ride on the periphery of cam 71 and is reciprocated vertically thereby. Cam 71 is shaped so that rod 73 reciprocates a cutter or trimmer 75 vertically during each time period a head assembly is at station B to cut or trim the handle as will hereinafter be further described.

Figures 3, 3A:
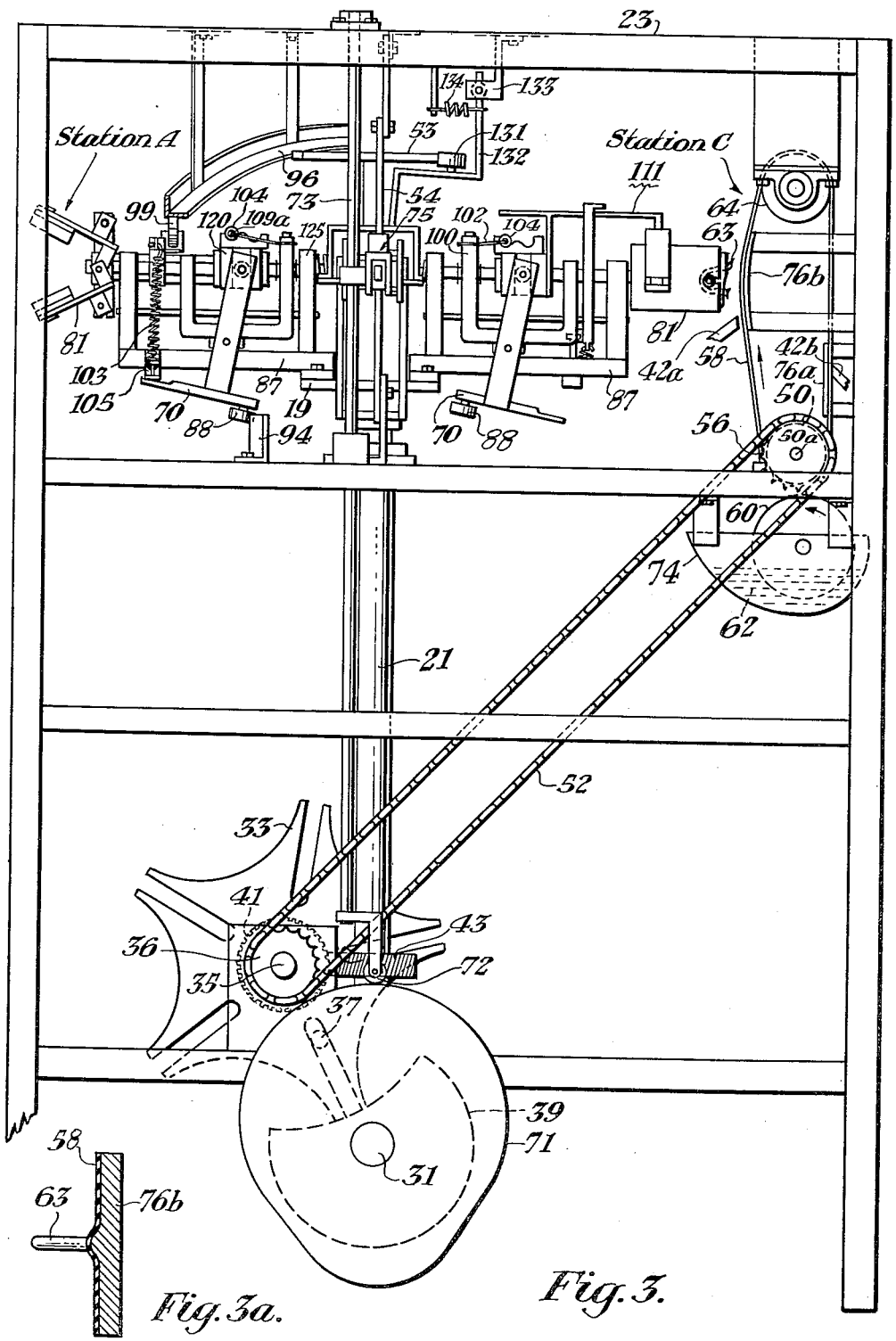
FIG. 3 is a side view of the embodiment of FIG. 1.
FIG. 3a is an enlarged view of the contoured backing plate of FIG. 3.

As best seen in FIG. 3 a link chain 52 connects driving sprocket 36 on shaft 35 to driven sprocket 56 at station G. Sprocket 56 and roller 50 are mounted on shaft 50A. A continuous belt 58 encircles roller 50 and a second roller 64 spaced from roller 50. Belt 58 passes between roller 50 and a third roller 60, which is partly submerged in a bath of adhesive liquid 62 in container 74. Roller 60 is rotated by frictional contact with belt 58. Roller 60 may include projections, not shown, on the sides thereof to cause a stirring action in liquid 62 to prevent settling of the liquid. Rotation of shaft 35 drives sprocket 56 to directly rotate roller 50; and thus, belt 58, roller 60 and roller 64, in a direction as indicated by the arrows in FIG. 3. As roller 60 is rotated through liquid 62 a film of adhesive liquid adheres to its surface which liquid coats belt 58.

A scraper 42a is positioned approximately one-thirty-secondth of an inch from belt 58 to level the liquid to an exact predetermined thickness at the point where handle 63 contacts the liquid. A second scraper 42b and its backing plate 76a are positioned to contact belt 58 to remove all the remaining liquid or dried material from the belt before it re-enters the bath. This assures that as the belt leaves the bath, the clay liquid adhering to the belt has a consistent moisture content.

A backing plate 76b is arranged to provide a backing corresponding to the shape of the surface of the cup onto which the handle 63 is to be affixed. As shown in FIG. 3a (FIG. 3a is in the lower left hand corner of sheet 3) backing plate 76b may also be formed so that belt 58 attains a shape to exactly fit the ends of the handle 63 which are contoured to conform to the diameter of the cup. Alternatively, belt 58 itself may initially be made to have a contour to fit the ends of the handle 63.

Head assemblies 11, 13, 15 and 17 are identical in structure and operation.

FIGS. 4 and 5 best show the structural details of one of the head assemblies, say 11, mounted on a base member 87. Base 87 is affixed to center plate 19 which is in turn attached to the vertical shaft 21, see FIG. 1. Base 87 includes a pair of spaced vertical extensions 87a and 87b each of which extensions include apertures, not numbered, through which a horizontally disposed shaft 85 passes. Shaft 85 is rectilinearly reciprocatable and is rotatable about its own axis as will be explained in detail hereinbelow. A spring 90 circumposed on shaft 85 and compressed between extension 87b and a shoulder 98 formed on the right hand end of shaft 85 biases the shaft inwardly or toward the right as oriented in the drawings. A pair of jaws 81a and 81b, referred to generally as jaws 81, are pivoted on the end of shaft 85 by a pin 83. Jaw insert blocks 78a and 78b referred to generally as insert blocks 78, are attached to jaws 81a and 81b, respectively, as by bolts 80. Insert blocks 78a and 78b each include a recess 79; each recess preferably conforming to one half of the cup handle 63 diameter and formed to receive a handle in a position with the ends of the handle extending outwardly.

The insert blocks 78 are preferably cast from a plastic material which will form to a glossy finish for minimizing any tendency of the clay to adhere to the insert blocks. The depth of the insert recesses 79 should be sufficient to permit the handle to be held slightly loose when the jaws are closed so that the handle cannot then be damaged by rapid closing of the jaws. It will be apparent that other insert blocks similar to insert blocks 78 and having suitably shaped recesses to receive handles of any shape desired may be interchangeably mounted on jaws 81.

Jaws 81 are actuated to an open or closed position by a control arm 111 as will be explained in detail hereinbelow. Arm 111 includes a transverse bar 113, see also FIG. 2. A pair of spaced legs 115, only leg 115a being shown in the drawings, extend downward from bar 113 and each leg includes a projecting foot 116a and 116b, see FIG. 5a. Feet 116a and 116b include recesses 117a and 117b which receive rollers 82a and 82b journaled on projections 84a and 84b of each of jaws 81a and 81b, respectively.

Control arm 111 passes through an aperture 91a in a transverse member 91 which member thus controls the vertical horizontal orientation or positioning of arm 111, see FIGS. 4 and 4a. Transverse member 91 is clamped on shaft 85 and rigidly affixed thereto as by a bolt, not numbered. A spring 103 affixed to a bracket 105 on base 87 attaches at an elbow 101 on transverse member 91 to bias member 91 to a vertical orientation or position. Elbow 101 is urged against a stop in the form of a roller 106 to maintain member 91 in a vertical position. Roller 106 is free to rotate and thus horizontal movement of elbow 101 and arm 91 develops only a minimum of friction thereon.

An L-shaped extension 95 having a striker roller 99 journaled on the free end thereof is mounted on transverse member 91 as by bolts 93. Member 91 is rotated to a horizontal position when roller 99 strikes a guideway 96 positioned on frame 23 between stations D and A, see FIG. 1. Thus member 91 is effective to rotate control arm 111, shaft 85 and jaws 81 to a horizontal position.

Control arm 111 further includes a vertical extension 110 having an apertured cylindrical lower portion 112, through which shaft 85 passes. A suitable bushing, not shown, is interposed between shaft 85 and cylindrical portion 112 to facilitate relative motion therebetween. A tubular shuttle 120, which is effective to open and close jaws 81, as will be further described hereinbelow, rides on cylindrical portion 112. A flange ring 118 is attached as by screws, not shown, to portion 112 to provide a retaining surface for shuttle 120.

Shuttle 120 includes a pair of slots 122 on opposite sides thereof; only one slot 122a being shown in the drawings. A roller 130 affixed to a pin 126 rides in each of the slots 122, and each pin 126 is in turn affixed to a respective arm 127. In FIGS. 4 and 5 one arm 127 is directly behind the other so that only one arm can be shown. Arms 127 are pivoted intermediate their ends on pivot pins 129 mounted on a U-shaped yoke 100. The free ends of the U-shaped yoke 100 are journaled on shaft 85. Retainer rings 85a on shaft 85 cause yoke 100 to move in accordance with any longitudinal movement of shaft 85; however, shaft 85 may rotate relative to yoke 100. To assure that yoke 100 remains in a vertical position when shaft 85 is rotated, a guide rod 107 mounted on and extending between vertical extensions 87a and 87b passes through apertures, not numbered, formed in the lower part of the legs of the yoke.

Yoke 100 carries or moves the pivot points or pins 129 for arms 127 in accordance with the longitudinal movement of shaft 85 to permit the jaws 81 to be opened or closed independently of the radial position of shaft 85. It will be appreciated that it is the relative movement of shuttle 120 and thus of control arm 111 with respect to shaft 85 which controls the opening and closing of the jaws 81.

As noted, one end of each arm 127 engages shuttle 120 while the other end of each arm is affixed to a treadle 70. When the front or left end of treadle 70 is urged upwards by roller 69 on rod 67, the back or right end of the treadle is urged downwards and arms 127 will pivot on pins 129 to actuate shuttle 120 inwardly, that is, toward the central vertical rod 47. Treadle 70 is sufficiently long to rest on roller 69 regardless of the position of shaft 85 and yoke 100. As shuttle 120 moves inwardly it engages flange ring 118 on cylindrical portion 112 to move control arm 111 inwardly relative to shaft 85. As control arm 111 is moved relative to shaft 85, each foot 116 on legs 115 of transverse bar 113 bears against the respective roller 82 to pull jaws 81, which are pivoted by pin 83 on shaft 85, to an open position; see FIG. 5a. Conversely when the back end of treadle 70 is moved in an opposite direction by roller 88, as will be explained hereinbelow, shuttle 120 will be actuated outwardly. As shuttle 120 moves outwardly it engages extension 110 of control arm 111, and control arm 111 is moved relative to shaft 85. Each foot 116 then bears outwardly against the respective roller 82 to push jaws 81 closed.

To maintain jaws 81 locked in either an open or closed position a U-shaped spring wire 102 is affixed to the free end of one of the legs of yoke 100 as by bolts 124, and a lock roller 104 is journaled in the bight of wire 102. Roller 104 is moveable between a pair of semicylindrical recesses 109a and 109b, referred to generally as recesses 109, formed on an upper surface of shuttle 120.

Roller 104 rides in recesses 109 and is effective to maintain control arm 111 relatively firmly in either its normal inward or an extended outward position with relation to yoke 100 and shaft 85. For example, as control arm 111 is extended outward, roller 104 rides over the hump between the two recesses and into the inner recess 109b, see FIG. 4. This action has two effects. First, the operation of roller 104 tends to cause control arm 111 to move outwardly with a snap action, for as soon as the roller moves over the hump between the recesses it will, in effect, pull control arm 111 forward or outward as the roller drops into the inner recess 109b. Secondly, roller 104 locks control arm 111 in its extended position since wire 102 is sufficiently stiff or rigid to hold roller 104 in recess 109b until the control arm is forced inward by shuttle 120. The action of roller 104 is, of course, similar when arm 111 is moved inwardly. As will be appreciated, roller 104 remains relatively stationary and it is effectively the recesses 109 which are moved to obtain locking engagement with the roller. If it is desired to obtain a more rigid locking action a second roller 119 similar in construction and operation to roller 104 may be mounted on transverse member 91. Either or both rollers can, of course, be employed. The radially movable elements of the head assemblies can thus be held firmly in one of two positions by one or both of the locking rollers while various operations are performed on the cup handle, and thus, vibrations or frictional forces do not adversely affect the function of the head assemblies.

It will be apparent that jaws 81 can be opened or closed regardless of the position or orientation of shaft 85.

Figure 2:
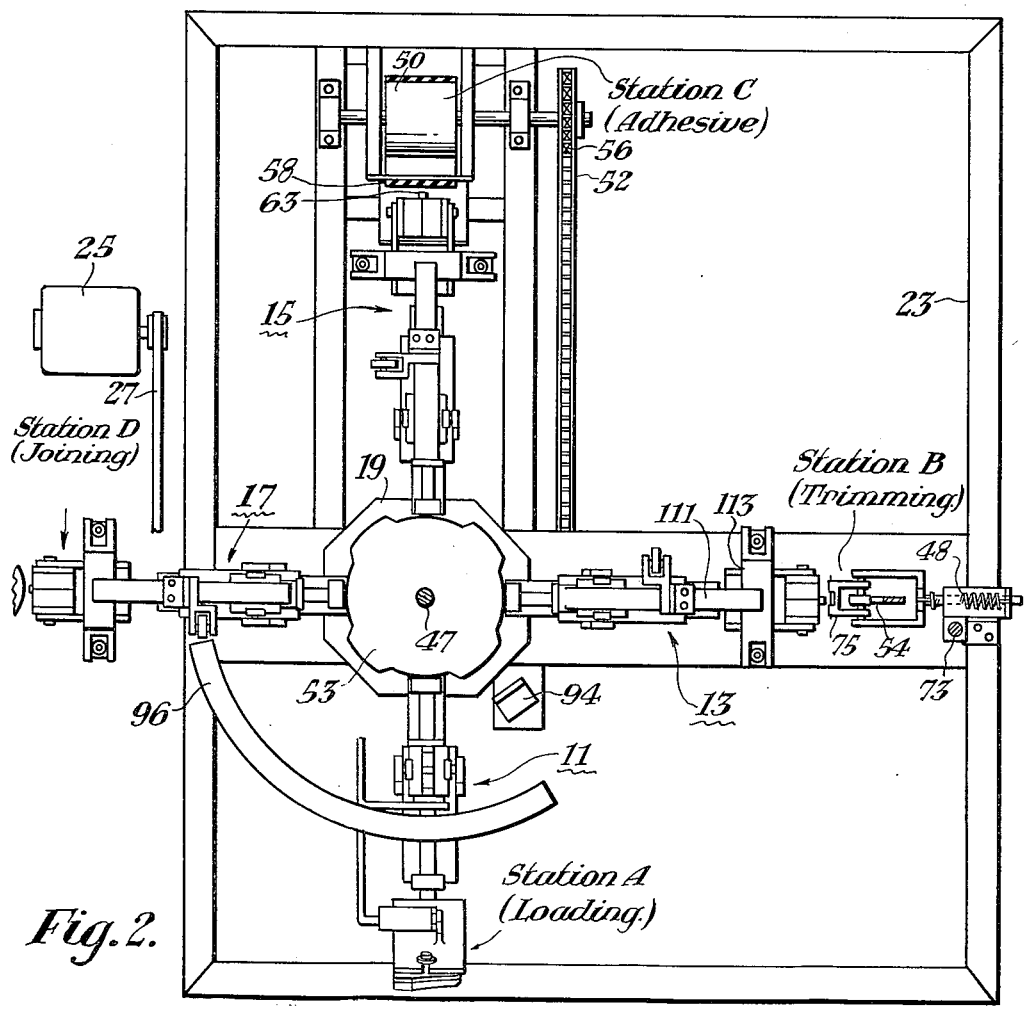
FIG. 2 is a top plan view of the embodiment of FIG. 1.

Referring now to FIG. 1 as well as FIGS. 2, 4, and 5, the periphery of a radial cam 53 mounted near the top end of continually rotating rod 47 bears against a roller 131 mounted on a rocker arm 132. The top end of rocker arm 132 is pivoted on bracket 133 attached to frame 23, and the lower end of arm 132 is normally biased inwardly, that is toward the central vertical rod 47 by a spring 134. It will be appreciated that each of stations B, C, and D include similar rocker arm units so that a description of one rocker arm will suffice. The lower end of rocker arm 132 is disposed to be in a position adjacent the inner end of a shaft 85. The periphery of cam 53 is contoured, see FIG. 2, so that the lower part of the rocker arm 132 is periodically urged outwardly, that is, away from the central vertical rod 47 to push shaft 85 and jaws 81 outwardly to move the handle 63 toward the operating unit at each station. For example, at station D the raised portions of cam 53 urges rocker arm 132, hence shaft 85 and the associated jaws 81 outwardly to press a handle 63 against cup 59 for a sufficient time to permit the adhesive to adhere the handle to the cup. Then, as described above, shuttle 120 is urged inwardly by arm 127 to open jaws 81 to release the cup handle. A rest portion of cam 53 next rotates against roller 131 on arm 132, and allows spring 90 to return the shaft 85 to its innermost position.

The operation of a head assembly through each of its positions will now be outlined proceeding from station A to station D in the normal sequence of operation. At station A, the jaws 81 are in an open and horizontal position or orientation preparatory to receiving a cup handle, see FIGS. 1 and 2. The jaws are turned to a horizontal position for convenience in manually placing the handle in the jaws 81. A cup handle is initially loaded into the recess 79 in block 78b while the shaft is in an initial or retracted position. As Geneva gear 33 commences to rotate head assembly 11 in a counterclockwise direction toward station B, roller 88 mounted on the inward end of treadle 70 strikes and is rotated around the inner or right side of a bracket 94 mounted on frame 23, see FIG. 3. This action causes arm 127 to pivot on pin 129 and urges shuttle 120 outward which in turn pushed control arm 111 outward relative to shaft 85 to close jaws 81. Just after jaws 81 are closed, the head assembly 11 and roller 99 move past the end of guide 96, and jaws 81 are pulled to a vertical position by spring 103. Alternatively a second pusher rod similar to rod 67 but having a timing sequence different from rod 67 may be positioned to push up against the inward end of treadle 70 to close the jaws 81 before the head assembly begins to move.

Station B includes a trimmer assembly 140. At station B a rocker arm 132 actuated by the raised portion of cam 53, as noted above, urges shaft 85 outwardly, or to the right as oriented in FIG. 1, to position the handle 63 at a point where the trimmer assembly 140 is effective to trim the handle. As will be obvious, at station B, as well as at station C, shuttle 120 and treadle 70 are not operated so the jaws 81 remain closed.

Referring to the particular structure of the trimming assembly 140, surface 54 of guideway 44 is contoured to guide trimmer 75 and the included cutting blade 40 to trim handle 63 to exactly fit the side of the respective cup 59, see FIG. 1a (FIGS. 1a and 1b are on the same sheet as FIGS. 4 and 5). Trimmer 75 is formed in an H-shape and blade 40 is mounted by bolts and clamp unit 38 on the outward ends of the legs of the trimmer. The inner ends of the trimmer legs are journaled on pins 75a mounted on U-shaped holder 75b to permit trimmer 75 to pivot about pins 75a. A pair of rollers 75c are journaled between the inner ends of the trimmer legs. Rollers 75c are urged or biased against the guide surface 54 of guide 44 by spring 48. Thus as trimming unit 140 is reciprocated vertically the trimmer 75 carries the cutter blade 40 in a path determined by guide surface 54 to trim the handle. Trimmer assembly 140 is reciprocated by roller 72, rod 73 and cam 71 to trim each cup handle during the downward stroke. The periphery and timing of cam 71 are arranged to cause the cutting blade 40 to descend immediately when the jaws start to retract, thus permitting a maximum amount of time for the blade to arrive at its highest position before the next head assembly is brought into position. The solid lines in FIG. 1a show the extreme upward position of trimmer 75 and the dotted lines show the extreme downward position.

The ends of the legs of trimmer 75 may be beveled to cause blade 40 to form a convex shape as shown in FIG. 1b to trim a handle to exactly fit the diametrical contour of the cup to which it is to be joined. Other suitably shaped guideways may be substituted for guideway 54 to provide a properly fitting handle for any shape cup.

Referring now to FIG. 3, the head assembly 11 is next rotated by Geneva gear 33 to station C where the adhesive liquid is applied to the ends of the cup handle. Link chain 52, driven by the sprocket 36 mounted on shaft 35, drives belt 58 on its rollers 50 and 64. Belt 58 also frictionally engages and drives roller 60, and since roller 60 is partially submerged in a bath 62, belt 58 is moistened with adhesive liquid as the belt passes between rollers 50 and 60; any excess of adhesive is removed by scraper 42a.

The rocker arm 132 at station C is actuated by the raised portion of cam 53, as noted above, such that the cup handle is pushed toward the surface of the belt 58 so that the adhesive is applied to the ends of the handle. A rest portion of cam 53 then bears against arm 132 permitting shaft 85 and jaws 81 to be retracted by spring 90 to their initial position.

The head assembly 11 is next rotated by Geneva gear 33 to station D. Again as noted above cam 53 moves the lower end of rocker arm 132 outward against the end of shaft 85 to push the jaws 81 holding the handle 63 against the side of a cup 61 and in an inverted position by chuck 59. The handle 63 is pressed onto the side of the cup 61 and held in this position for a short, but definite, interval so that the adhesive liquid adheres the handle to the cup. Next, a raised portion of cam 65 on shaft 35 lifts rod 67, causing roller 69 to urge the front end of treadle 70 upwards. Upward movement of the front end of treadle 70 causes shuttle 120 to be moved inwardly against flange ring 118 of control arm 111 to move said arm relative to shaft 85 to open jaws 81, as described above. The rotation of cam 55 which controls the position of the cup 61 is timed and its periphery cut so that as soon as jaws 81 open, rod 57 descends and consequently cup carrying chuck 59 and cup 61 are lowered out the angular path of the jaws 81 preparatory to rotating the head assembly past the cup position. Alternatively, the jaws 81 may be opened sufficiently wide to afford clearance to move the jaws past the cup position without having to lower the cup. As the head assembly 11 starts to move to station A, striker roller 99 on extension 95 of transverse member 91 strikes guide 96 and the jaws 81 are rotated to a horizontal position preparatory to receiving a next cup handle.

In certain instances the handles to be processed may not have exactly uniform widths, due to, for example, using warped molds to form the handles, or other causes. In these instances, any handles having widths exceeding the width of the cavity formed by the recesses 79 in the closed insert blocks 78 may be damaged as the jaws are closed.

I have therefore, provided a second embodiment of a head assembly according to my invention constructed to provide a fully controlled closing operation of the jaws 81 at any desired rate of speed.

Referring to FIG. 6 (FIG. 6 is on the same sheet as FIG. 2), the similarity of the head assembly as here shown to that of the previous figures is apparent, thus only those components in FIG. 6 which are different from those of the previous figures will be explained. In this embodiment, the yoke 100 is not employed, rather the pivot pin for arm 127 is affixed to base 87 and thus the pivot point is stationary; further, the locking rollers 104 and 119 and their associated recesses are not employed. Control arm 111 is normally biased outwardly with respect to shaft 85 by coil spring 146 circumposed on the shaft 85 and bearing against a shoulder 141 formed on the shaft. The lower part of pivoted arm 127 is biased inwardly by a spring 142 and causes the upper part of arm 127 and shuttle 120 to normally be forced outwardly with respect to shaft 85. Arm 127 is modified to have an extension 143 which engages a stop 144 on the head assembly to limit the biasing effect of spring 142. Thus, it will be appreciated that the control arm 111 and shuttle 120 are normally biased, by springs 146 and 142, respectively, outwardly with respect to shaft 85 to hold jaws 81 closed.

As shown in FIG. 6, shaft 85 has been moved to an extended position by the action of rocker arm 132 as explained hereinabove. When it is desired to open the jaws 81, a pusher rod 67 positioned at each of the loading and joining stations is moved upwardly at a desired rate, by cams, as described hereinabove, such that roller 69 engages treadle 70 on arm 127. Due to the foregoing movement, shuttle 120 is forced inwardly against flange ring 118 to move control arm 111 inwardly against the biasing force of spring 146. Since shaft 85 is being held stationary by the rocker arm 132, control arm 111 moves relative to shaft 85 and thus causes jaws 81 to open also as explained hereinabove. When it is desired to close the jaws, pusher rod 67 is lowered at a desired rate and spring 142 pulls extension 143 of arm 127 to engage stop 144, allowing spring 146 to push control arm 111 outwardly relatively to shaft 85 to close jaws 81. Jaws 81 are thus closed and opened as determined by the controlled movement of pusher rod 67. Alternatively, if rod 67 remains up as shaft 85 is retracted, the jaws 81 will close dependent upon the controlled movement of shaft 85. This occurs since control arm 111 will be held stationary and shaft 85 moves relative thereto. It will be appreciated that in both of the embodiments described above it is the relative movement of control arm 111 with respect to shaft 85 which controls the opening and closing of jaws 81.

From the preceding description, it will be seen that the jaws may also be caused to open and close at any position of their reciprocating travel while the transfer head assembly is temporarily stopped at an operating station. This may be accomplished, for example, by positioning a second pusher rod, similar to rod 67, to engage the back end of treadle 70. The pusher rods would be adjusted to be in proper time sequence to effect opening and closing of the jaws as desired. Alternatively, the jaws may also be caused to open and close while traveling between operating stations by providing a second unit similar to roller 88 at the opposite end of treadle 70 and arranged to strike a bracket similar to bracket 94 to open the jaws 81. In both cases, the jaws may be opened and closed without regard to the pivoted orientation of the jaws.

While my invention has been described with reference to a particular desirable embodiment thereof, it will be understood that various modifications may be made by those skilled in the art without departing from the invention. The appended claims are therefore intended to cover all such modifications within the true spirit and scope of the invention.

Having thus described my invention, what I claim is:

1. In an appendage holding device the combination comprising a support, jaws arranged to be opened and closed carried by said support, means for reciprocating said support from an initial position to an extended position, a linkage member operatively connected to said jaws, means for moving said linkage member in accordance with the movement of said support to maintain said jaws in a closed position, means for moving said linkage member relative to said support to cause said jaws to be opened and closed at any position of said support, said linkage member having a pair of recesses separated by a raised portion formed thereon, a locking roller, means affixing said locking roller to said support, said roller arranged to ride from one of the said pair of recesses to the other of said pair as said linkage member is moved relative to said support whereby said linkage member is locked in position with respect to said support to maintain said jaws opened and closed.

2. In a transfer head assembly the combination comprising a shaft, jaws normally spring biased to a closed position carried by said shaft, means for reciprocating said shaft, a linkage member operatively connected to said jaws and said shaft, means for moving said linkage member in accordance with the movement of said shaft to cause said jaws to remain in a closed position, and means for controllably moving said linkage member relative to said shaft to control the opening and closing of said jaws.

3. In a machine for attaching appendages to articles, a first shaft, means for intermittently rotating said shaft about its axis, a second shaft mounted on said first shaft and being positioned transversely to said first shaft, a pair of jaws for holding said appendages, said jaws being pivotally mounted on the outward end of said second shaft, a control arm engaging said jaws, said control arm including a portion which is slidable on said second shaft, a shuttle movably mounted on said control arm and arranged to be reciprocable between inward or initial and outward or extended positions, means for reciprocably moving said shuttle, said shuttle when moved outwardly urging said control arm outwardly relative to said second shaft to close said jaws, and said shuttle when moved inwardly urging said control arm inwardly relative to said second shaft to open said jaws.

4. In a machine for joining appendages to articles, a first shaft, means for intermittently rotating said shaft about its axis, a second shaft mounted on said first shaft and being positioned transversely to said first shaft, a pair of jaws for holding said appendages, said jaws being pivotally mounted on the outward end of said second shaft, a control arm including a portion which is slidable on said second shaft, said slidable portion having a first section and a pair of shoulder sections, a shuttle movably mounted on said first section and arranged to be reciprocable between inward or initial and outward or extended positions, means for reciprocably moving said shuttle, said shuttle when moved outwardly engaging one of said shoulder sections for urging said control arm outwardly relative to said second shaft to close said jaws, said shuttle when moved inwardly engaging the other of said shoulder sections for urging said control arm inwardly relative to said second shaft to open said jaws, a transverse member bracketing said control arm for controlling the orientation of said jaws, means biasing said transverse member to vertical orientation, and means for rotating said transverse member to a horizontal orientation.

5. A machine for joining appendages to articles which articles are disposed with their axes substantially vertically comprising in combination, a first shaft intermittently rotatable about its axis, a second shaft pivotable about its own axis carried by said first shaft and extending transversely from the axis of said first shaft, a pair of appendage holding jaws pivotally mounted on the outward end of said second shaft, a control arm engaging said jaws, said control arm including a portion slidable on said second shaft, said slidable portion having a first section and a pair of shoulder sections, a shuttle movably mounted on said control arm and arranged to be reciprocable between inward or initial and outward or extended positions, means for reciprocably moving said shuttle, said shuttle when moved outwardly urging said control arm outwardly relatively to second shaft to close said jaws for holding an appendage, said shuttle when moved inwardly urging said control arm inwardly relatively to said second shaft to open said jaws for releasing a held appendage, a plurality of stations for receiving and processing the appendages and a station for joining the appendage to the article, said first shaft being effective to convey said second shaft and said jaws from said receiving station through said processing stations to said joining station, means for pivoting said second shaft to position said jaws in a horizontal orientation for receiving said appendage, means for pivoting said jaws to a vertical orientation to hold said appendage in position for joining to its respective article, means for extending said jaws in a longitudinal direction with respect to the axis of said second shaft for pressing and joining the appendage to the side of the article, and means for retracting said jaws.

6. In an appendage holding device the combination comprising a support, jaws arranged to be opened and closed carried by said support, means for reciprocating said support from an initial position to an extended position, a linkage member operatively connected to said jaws, means for moving said linkage member in accordance with the movement of said support to maintain jaws in a closed position, means for moving said linkage member relative to said support to cause said jaws to be opened and closed, first and second locking parts, means affixing said first locking part to said linkage member, means affixing said second locking part to said support, and first locking part arranged to travel into a locking contact with said second locking part as said linkage member is moved relative to said support whereby said linkage member is locked in position with respect to said shaft to maintain said jaws in a closed position.

7. In a transfer head assembly the combination comprising a shaft, jaws normally spring biased to a closed position carried by said shaft, means for reciprocating said shaft, a linkage member operatively connected to said jaws and said shaft, means for moving said linkage member in accordance with the movement of said shaft to cause said jaws to remain in a closed position, means for controllably moving said linkage member relative to said shaft to control the opening and closing of said jaws, a transverse member bracketing said linkage member for controlling the orientation of said jaws, means biasing said transverse member to vertical orientation, and means for rotating said transverse member to a horizontal orientation.

8. In a transfer head assembly the combination comprising a shaft, jaws arranged to be opened and closed carried by said shaft, a control arm engaging said jaws, said control arm including a portion which is slidable on said shaft, a shuttle movably mounted on said control arm and arranged to be reciprocable between inward or initial and outward or extended positions, means for reciprocably moving said shuttle, said shuttle when moved outwardly urging said control arm outwardly relative to said shaft to close said jaws, and said shuttle when moved inwardly urging said control arm inwardly relative to said shaft to open said jaws.

9. In a transfer head assembly, the combination comprising a shaft, jaws arranged to be opened and closed carried by said shaft, a control arm including a portion which is slidable on said shaft, said slidable portion having a first section and a pair of shoulder sections, a shuttle movably mounted on said first section and arranged to be reciprocable between inward or initial and outward or extended positions, means for reciprocably moving said shuttle, said shuttle when moved outwardly engaging one of said shoulder sections for urging said control arm outwardly relative to said shaft to close said jaws, said shuttle when moved inwardly engaging the other of said shoulder sections for urging said control arm inwardly relative to said shaft to open said jaws, a transverse member bracketing said control arm for controlling the orientation of said jaws, means biasing said transverse member to vertical orientation and means for rotating said transverse member to a horizontal orientation.

References Cited in the file of this patent

UNITED STATES PATENTS

| | | |
|---|---|---|
| 2,374,556 | Miller et al. | Apr. 24, 1945 |
| 2,537,922 | Strasser | Jan. 9, 1951 |
| 2,560,007 | Steele | July 10, 1951 |
| 2,619,701 | Jordan | Dec. 2, 1952 |